R. MEISTER.
APPARATUS FOR MANUFACTURING FODDER FROM BREWERY WASTE.
APPLICATION FILED MAY 28, 1909.
991,870.
Patented May 9, 1911.
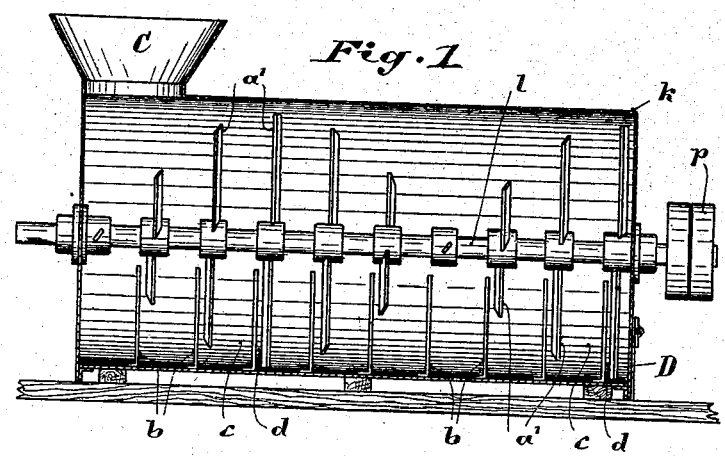
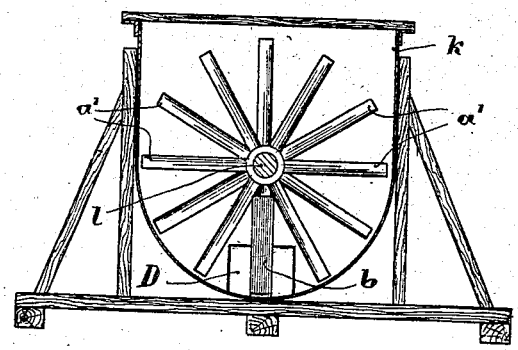

UNITED STATES PATENT OFFICE.

RICHARD MEISTER, OF MEERANE, GERMANY, ASSIGNOR TO THE FIRM OF PHÖNIX-WERK G. M. B. H., OF MEERANE, SAXONY, GERMANY.

APPARATUS FOR MANUFACTURING FODDER FROM BREWERY-WASTE.

991,870. Specification of Letters Patent. Patented May 9, 1911.

Application filed May 28, 1909. Serial No. 498,940.

*To all whom it may concern:*

Be it known that I, RICHARD MEISTER, a citizen of the German Empire, and resident of Meerane, Saxony, Germany, have invented certain new and useful Improvements in Apparatus for Manufacturing Fodder from Brewery-Waste, of which the following is a specification.

The manufacture of fodder from brewery waste (chilling sediments, barm etc.) is effected by drying the waste, stored for a certain time, and by admixing therewith other easily digestible fodder ingredients. The admixture of other fodder ingredients (dry grain, bran and the like) must be very considerable since the barm etc. is very difficult to digest, though containing a high percentage of nutrious ingredients. Experiments have shown, that this difficulty of digestion is caused by the formation of lumps, which occurs soon after the waste is stored and prevents perfect drying, and by the high percentage of hop-resins, present in the waste products. It was further found that the formation of lumps is caused by fermentation or decomposition of the products, whereby they become slimy and adhesive.

The present invention relates to a new apparatus for treating brewery waste, wherein the waste products are not stored, but are immediately mixed and thus placed in condition to be dried.

In order to reduce any tendency to fermentation, which during the drying process might cause the formation of lumps, the substance to be admixed is used as dry as possible and the mixing is performed very energetically with the use of high power. The dried substance absorbs the moisture contained in the barm, sediments etc., and as the former, in the first instance, is still sharp-edged, it will partly destroy the cellules of the barm, owing to the great friction produced and will also absorb the contents of said cellules, which are also damp. Owing to the intimate mixture, which may take place prior to the formation of lumps, the substance is further disintegrated so that subsequent chopping is facilitated, and the air in the case of the drying process can permeate better than before. A further advantage is, that the heat necesary for the drying process is kept below 100°, while up to the present, high temperatures were used which were very harmful to the digestibiltiy of the albumen.

In the accompanying drawing: Figure 1 is a longitudinal section of the mixing drum, and Fig. 2 a cross section thereof.

The letter $k$ represents the casing of the mixing drum in which is centrally mounted an axle 1 driven by belt pulley $p$. Shaft 1 carries a series of movable blades $a'$, while from the inner face of casing $k$, project a series of fixed blades $b$, the fixed blades alternating with the movable blades. The intermediate spaces $c$ and $d$ between a fixed and a movable blade $a'$, $b$ are unequal, so that each fixed blade is arranged at greater proximity to one of its flanking movable blades than to the other flanking movable blade. Thus the effect of the mixing is better and the kneading is more vigorous inasmuch as the substance has to pass alternately between the large and the small intermediate spaces. The movable blades $a'$ are set at an inclination to shaft $b$, while the fixed blades are set at right angles thereto, so that converging pockets will be formed between each pair of said blades, which upon the rotation of shaft 1 will subject the material entrapped thereby to a squeezing action.

The mixed product is introduced at C and is discharged at D, the discharged product being in condition to be dried.

I claim:

Apparatus of the character described, comprising a drum, a rotatable shaft mounted therein, a series of movable blades carried by the shaft and set at an inclination thereto, a series of fixed blades projecting from the drum and set at right angles to the shaft, each fixed blade being arranged in greater proximity to one of its flanking movable blades than to the other flanking movable blade.

In witness whereof I have hereunto set my hand in presence of two witnesses.

RICHARD MEISTER.

Witnesses:
WILLIAM J. KONJETZUY,
WM. WASHINGTON BRUNSWICK.

---

Copies of this patent may be obtained for five cents each, by addressing the "Commissioner of Patents, Washington, D. C."